(12) United States Patent
Kamatani et al.

(10) Patent No.: US 7,630,153 B2
(45) Date of Patent: Dec. 8, 2009

(54) MASTER CARRIER FOR MAGNETIC TRANSFER

(75) Inventors: Akito Kamatani, Kanagawa (JP); Kazuhiro Niitsuma, Kanagawa (JP); Seiji Kasahara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/927,010

(22) Filed: Aug. 27, 2004

(65) Prior Publication Data
US 2005/0078392 A1 Apr. 14, 2005

(30) Foreign Application Priority Data
Aug. 27, 2003 (JP) ............ P.2003-303036

(51) Int. Cl.
*G11B 5/86* (2006.01)
(52) U.S. Cl. ....................................... 360/17
(58) Field of Classification Search .................. None
See application file for complete search history.

(56) References Cited
U.S. PATENT DOCUMENTS

| | | | |
|---|---|---|---|
| 6,347,016 B1 | 2/2002 | Ishida et al. | |
| 6,858,329 B2 * | 2/2005 | Hamada et al. | 428/848 |
| 7,218,466 B1 * | 5/2007 | Deeman et al. | 360/17 |
| 2002/0051307 A1 * | 5/2002 | Nishikawa et al. | 360/17 |
| 2002/0150794 A1 | 10/2002 | Hamada et al. | |
| 2003/0123170 A1 * | 7/2003 | Miyata et al. | 360/17 |

FOREIGN PATENT DOCUMENTS

| | | |
|---|---|---|
| JP | 11-273070 A | 10/1999 |
| JP | 11-296849 A | 10/1999 |
| JP | 2000-339681 A | 12/2000 |
| JP | 2001-126247 A | 5/2001 |
| JP | 2002-074655 A | 3/2002 |
| JP | 2002-251721 A | 9/2002 |

OTHER PUBLICATIONS

European Search Report dated Mar. 16, 2006.
English translation of Japanese Office Action for JP 2003-30306 mailed Aug. 8, 2007.

* cited by examiner

*Primary Examiner*—Joseph H Feild
*Assistant Examiner*—Daniell L Negrón
(74) *Attorney, Agent, or Firm*—Sughrue Mion, PLLC (57) ABSTRACT

A master carrier for magnetic transfer, has: a support having an information writing region where a projection transfer pattern having a first projection is formed, the first projection corresponding to information to be transferred onto a magnetic recording medium; and a magnetic layer on the transfer pattern of the support,
wherein the master carrier has a second projection on a surface of the support and the second projection is formed in a region where the information writing region isn't formed to sustain the region where the information writing region isn't formed while the magnetic recording medium and the support are brought into intimate contact with each other.

12 Claims, 11 Drawing Sheets

PRIOR ART

FIG. 14

PRIOR ART

FIG. 15  PRIOR ART

MASTER CARRIER FOR MAGNETIC TRANSFER

BACKGROUND OF THE INVENTION

1. Technical Field of the Invention

The present invention relates to a master carrier for magnetic transfer, which magnetically transfers carried information onto a slave medium that is a magnetic recording medium by being brought into intimate contact with each other.

2. Description of the Related Art

Figure 13:
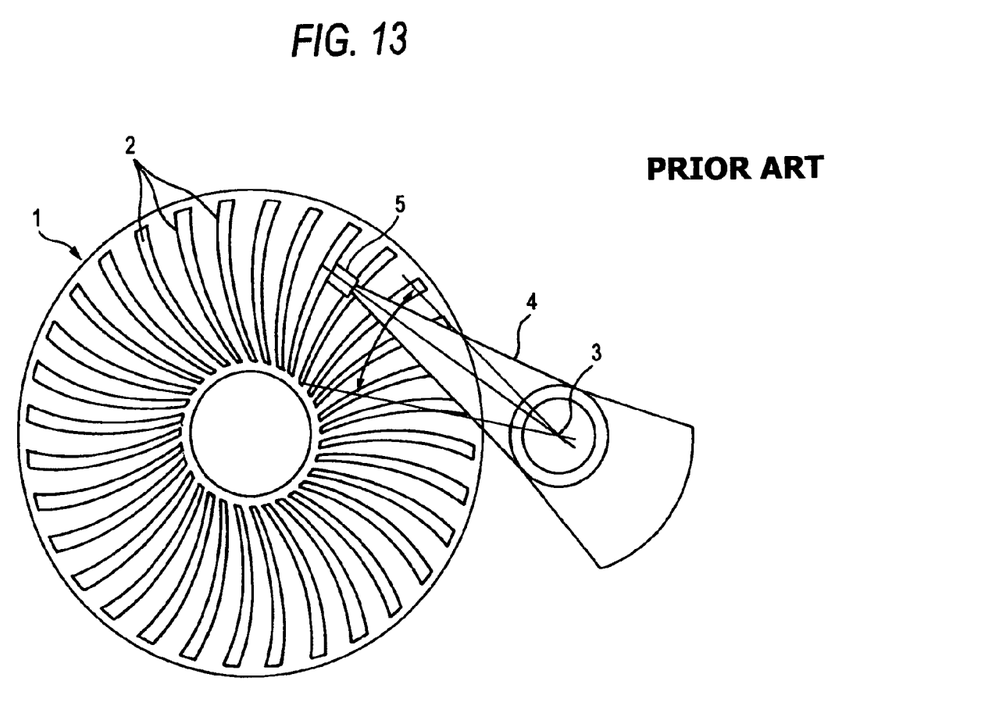
FIG. 13 is a schematic plan view to show a hard disk comprising a magnetic disk and a reading head.

In general, as shown in FIG. 13, a hard disk 1 has a plural number of servo zones 2 where a servo signal is written in the radius direction, and the position adjustment of a recording head 5 provided in the tip of a positioner 4 rotating around an axis 3 is indicated.

In recent years, the recording density of a hard disk becomes high, and following this, a servo signal becomes minute. For this reason, it is being designed to shorten the writing time by means of magnetic transfer. The principle of this magnetic transfer is applicable to not only hard disks but also floppy disks.

In the magnetic transfer, a transfer magnetic field is applied to a master carrier (patterned master), the master carrier having an transfer pattern corresponding to preformat information such as servo signals and having at least a magnetic layer thereon as a surface layer, in the state that the master carrier is brought into intimate contact with a slave medium that is a magnetic recording medium having a magnetic recording part, thereby transferring and recording a magnetic pattern corresponding to the information carried on the master carrier onto the slave medium.

Figure 14:
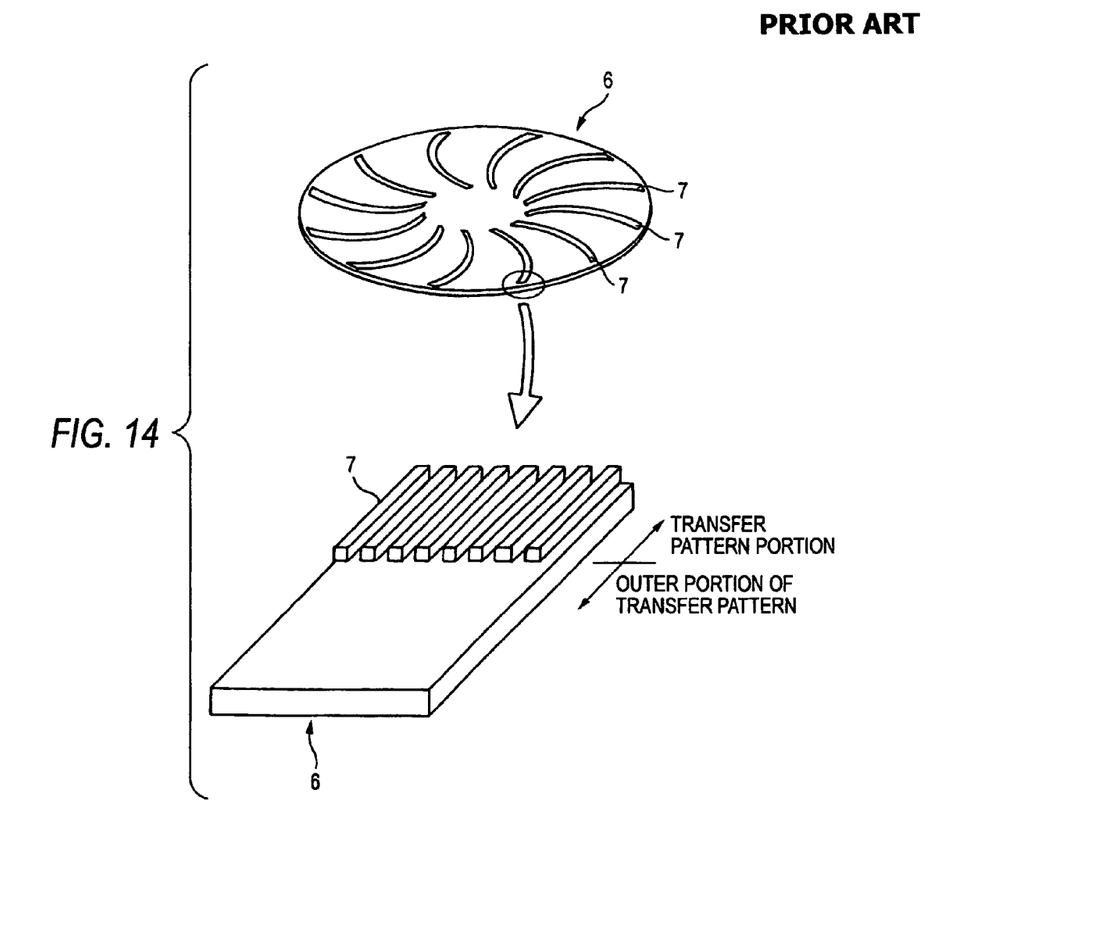
FIG. 14 is a perspective view to explain the structure of a master carrier.

As shown in FIG. 14, a master carrier 6 has a preformat information writing region 7 where a projection transfer pattern corresponding to the preformat information such as a servo signal is formed as described previously, and a magnetic layer is formed on this transfer pattern (for example, see U.S. Pat. No. 6,347,016).

SUMMARY OF THE INVENTION

Figure 15:
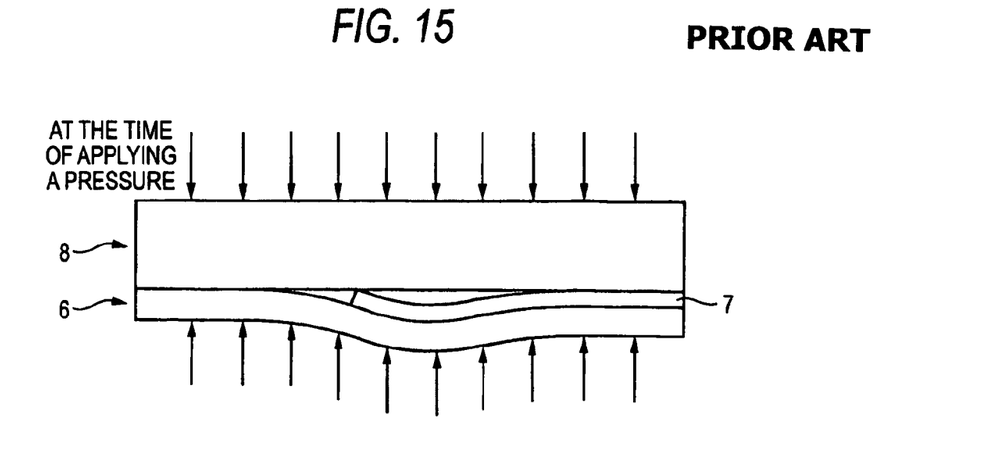
FIG. 15 is a cross-sectional view to show the intimate contact state between a master carrier and a slave medium the time of magnetic transfer.

As shown in FIG. 15, in order to perform magnetic transfer, if the foregoing master carrier 6 and a slave medium 8 are superposed and brought into intimate contact with each other by applying a pressure, the master carrier 6 causes deformation in a difference portion in level by projections constructing the transfer pattern of the preformat information writing region 7 of the master carrier 6. This difference in level is a boundary portion of the preformat information writing region 7 and is present in not only the peripheral direction but also the inner radius side and the outer radius side in the radius direction of the master carrier 6.

Also, when the master carrier 6 is deformed in this way, the surface of the slave medium 8 is damaged by an edge portion of the transfer pattern of the preformat information writing region 7.

Under the foregoing circumstances, this invention has been made, and its object is to provide a master carrier for magnetic transfer capable of performing magnetic transfer surely by bringing it into intimate contact with a slave medium satisfactorily without causing obstacles such as deformation and damage.

For the sake of achieving the foregoing object, the master carrier for magnetic transfer of the invention comprises a support having an information writing region where a projection transfer pattern having a first projection corresponding to information to be transferred onto a magnetic recording medium is formed; and a magnetic layer formed on the transfer pattern of the support, the master carrier being constructed such that a second projection is provided on the surface of the support with the exception of the information writing region and that the surface of the support with the exception of the information writing region is sustained by the second projection at the time when the magnetic recording medium and the support are brought into intimate contact with each other. The term "first projection" as used herein means a projection of the transfer pattern corresponding to information to be transferred onto a magnetic recording medium, in contrast "second projection" means a projection to be provided to sustain a part of the support.

According to this master carrier for magnetic transfer, since the surface of the support with the exception of the information writing regions having a projection transfer pattern is sustained by the second projection, the deformation caused by a difference in level as formed in the surrounding of the transfer pattern is prevented. Also, because of the matter that the deformation of the master carrier is prevented, damage caused when an edge portion of the transfer pattern bites into the surface of the magnetic recording medium is prevented.

In this way, according to the foregoing master carrier, it is possible to perform magnetic transfer satisfactorily by bringing it into intimate contact with the magnetic recording medium without causing obstacles such as deformation of the transfer pattern and damage onto the surface of the magnetic recording medium.

Preferably, the master carrier for magnetic transfer of the invention is characterized in that the upper surface of the second projection is formed so as to have a height the same as the height of the transfer pattern projection from the surface of the support.

According to this master carrier for magnetic transfer, since the second projection provided on the surface of the support with the exception of the information writing region has a height the same as the height of the transfer pattern projection from the surface of the support, deformation at the time of magnetic transfer and damage onto the magnetic recording medium caused by the deformation can be prevented more surely.

Preferably, the master carrier for magnetic transfer of the invention is characterized in that the second projection is formed in a plural number of lines concentrically or radially against the master carrier, and a depression is provided between the second projections.

According to this master carrier for magnetic transfer, since air between the master carrier and the magnetic recording medium is introduced to outside in the second depression at the time when the master carrier is brought into intimate contact with the magnetic recording medium, good adhesion can be obtained.

Namely, magnetic transfer onto the magnetic recording medium can be performed without causing obstacles such as deformation and damage. Moreover, it is possible to obtain good adhesion to the magnetic recording medium.

Preferably, the master carrier for magnetic transfer of the invention is characterized in that the second projection is provided in a plural number of positions in the dispersed state against the surface of the master carrier.

According to this master carrier for magnetic transfer, obstacles such as deformation and damage at the time of magnetic transfer can be prevented by the second projection. Also, air between the master carrier and the magnetic recording medium is introduced to outside from a space between the second projections, whereby good adhesion can be obtained.

Preferably, the master carrier for magnetic transfer of the invention is characterized in that a gap generated by the second projection at the time when it comes into intimate contact with the magnetic recording medium is communicated between the central side and the outer peripheral end of the master carrier.

According to this master carrier for magnetic transfer, magnetic transfer onto the magnetic recording medium can be performed without causing obstacles such as deformation and damage. Moreover, by introducing air to outside, it is possible to obtain good adhesion to the magnetic recording medium.

Preferably, the master carrier for magnetic transfer of the invention is characterized in that a plural number of the projections are set up so as to have an alignment pitch of from 0.1 μm to 1.5 mm.

According to this master carrier for magnetic transfer, magnetic transfer onto the magnetic recording medium can be performed without causing obstacles such as deformation and damage while supporting a region with the exception of the preformat information writing region at a good plane pressure at the time of magnetic transfer. Moreover, it is possible to obtain good adhesion to the magnetic recording medium.

According to the master carrier for magnetic transfer of the invention, since the surface of the support with the exception of the information writing region having a projection transfer pattern is sustained by the projection, the deformation caused by a difference in level as formed in the surrounding of the transfer pattern is prevented. Also, because of the matter that the deformation of the master carrier is prevented, damage caused when an edge portion of the transfer pattern bites into the surface of the magnetic recording medium is prevented.

In the light of the above, according to the foregoing master carrier, it is possible to perform magnetic transfer satisfactorily by bringing it into intimate contact with the magnetic recording medium without causing obstacles such as deformation of the transfer pattern and damage onto the surface of the magnetic recording medium.

DETAILED DESCRIPTION OF THE INVENTION

Modes for carrying out the master carrier for magnetic transfer according to the invention will be described below in detail with reference to the accompanying drawings.

First of all, the magnetic transfer will be described.

Figure 1:
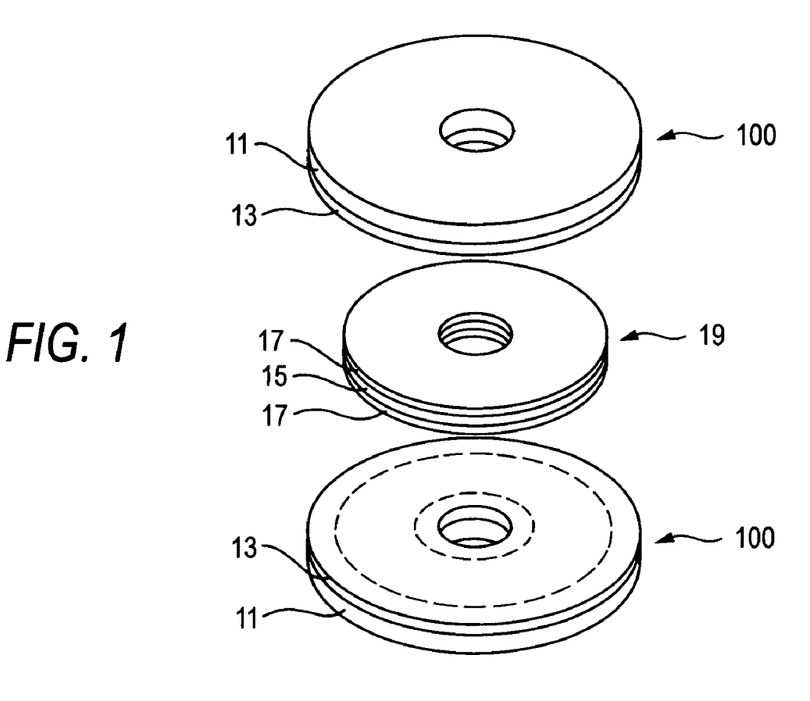
FIG. 1 is a perspective view of a slave medium and a master carrier to explain magnetic transfer.

FIG. 1 is a perspective view of a slave medium and a master carrier for explaining the magnetic transfer; and FIG. 2 is a cross-sectional view for explaining the principle of magnetic transfer.

As shown in FIG. 1, each of master carriers 100 has a transfer pattern having a projection of a format signal such as a servo signal and a magnetic layer 13 thereon to a surface of a support 11. Further, a transfer magnetic field is applied to the master carriers 100 in the state that they are respectively brought into intimate contact with the front and back surfaces of a slave medium 19 having magnetic recording sections 17 on the front and back surfaces of a support 15, thereby transferring and recording a magnetic pattern corresponding to information on carried on each of the master carriers 100 onto the slave medium 19 that is a magnetic recording medium.

Figures 2A, 2B, 2C:
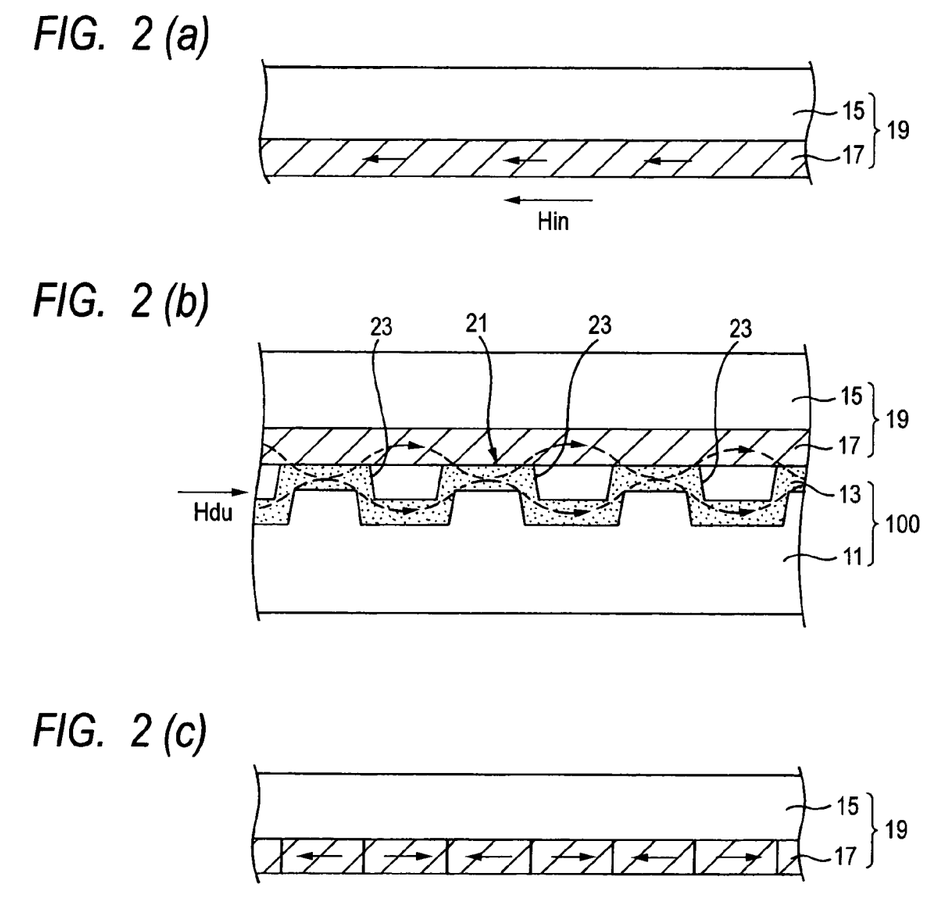
FIG. 2 is a cross-sectional view to explain the principle of magnetic transfer.

Concretely, the slave medium 19 in which an initial magnetic field Hin going in one direction is previously imparted to the magnetic recording section 17 as shown in FIG. 2A is brought into intimate contact with the master carrier 100 and applied with a transfer magnetic field Hdu as shown in FIG. 2B.

In this way, this transfer magnetic field Hdu is absorbed into the magnetic layer 13 portion of a projection 23 of a transfer pattern 21 with which the slave medium 19 is brought into intimate contact. The initial magnetic field Hin of the slave medium 19 in this portion is not reversed, whereas the initial magnetic field Hdu in other portion is reversed. As a result, a magnetized pattern corresponding to the transfer pattern 21 of the master carrier 100 is transferred and recorded onto the slave medium 19 as shown in FIG. 2C.

Next, the master carrier to be used for the foregoing magnetic transfer will be described.

First Embodiment

Figure 3:
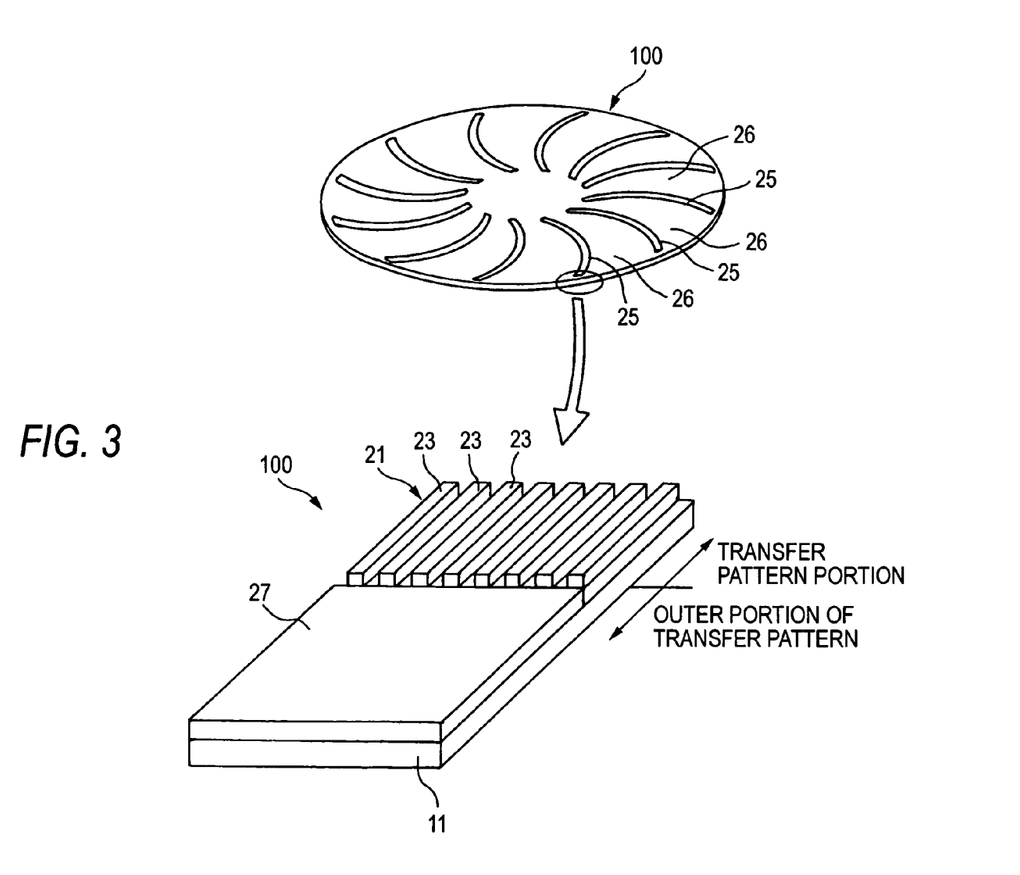
FIG. 3 is a perspective view to explain the structure of the master carrier according to the First Embodiment of the invention.

FIG. 3 is a perspective view for explaining the structure of a master carrier according to the First Embodiment.

As described previously, this master carrier 100 has a preformat information writing region 25 (hereinafter referred to as "information writing region") in which a plural number of projection transfer patterns 21 corresponding to the preformat information such as a servo signal are substantially radially formed towards the radius direction, and a space between the information writing regions 25 is defined as a data region 26.

Also, in this master carrier 100, a projection 27 is formed in both or either one of the inner peripheral side and the outer peripheral side of the information writing region 25 (in the drawing, the outer peripheral side is mainly illustrated and explained as one example). That is, the projection 27 is formed on the surface of the support 11 with the exception of the information writing region 25. This projection 27 is, for example, formed by a process such as photo-lithography, EB exposure, and laser exposure and is formed integrally with the support 11. Also, the projection 27 is positioned adjacent to the transfer pattern 21 of the information writing region 25. The upper surface of the projection 27 is formed so as to have a substantially same height as that of the projection 23 of the transfer pattern 21 formed in the information writing region 25, which projects from the surface of the support 11.

Figure 4:
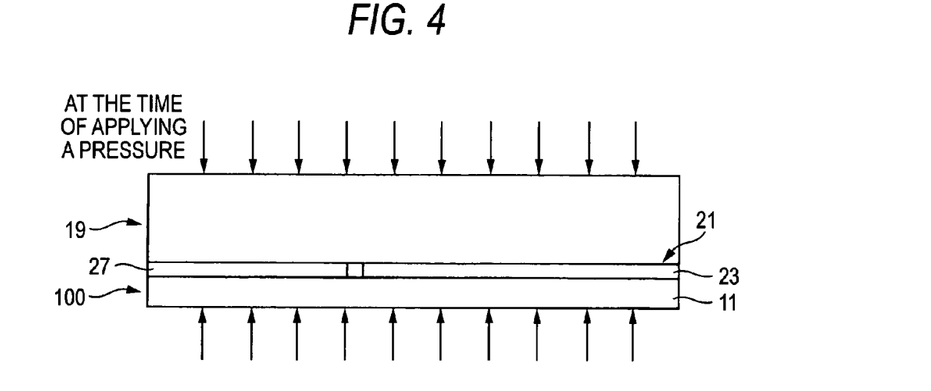
FIG. 4 is a cross-sectional view to explain the intimate contact state between a master carrier and a slave medium at the time of magnetic transfer.

Further, as described previously, in the master carrier 100 having the projection 27, for the sake of performing magnetic transfer, when the master carrier 100 and the slave medium 19 are superposed and brought into intimate contact with each other, the transfer pattern 21 of the information writing region 25 and the projection 27 of the master carrier 100 come into contact with the slave medium 19 as shown in FIG. 4.

In this way, in the master carrier 100, since the inner and outer peripheral sides of the projection transfer pattern 21 are sustained by the projection 27, deformation caused by a difference in level to be formed in the inner and outer peripheral sides of the transfer pattern 21 is prevented. Also, because of the matter that the deformation of the master carrier 100 is prevented; damage caused when an edge portion of the transfer pattern 21 bites into the surface of the slave medium 19 is prevented.

Incidentally, in the case where the projection 27 is constructed such that it does not have a magnetic layer to be formed on the transfer pattern 21, thereby having a non-magnetic surface property, since the magnetic information does not remain in the slave medium 19 after the transfer, it is not necessary to make the drive side to read and write signals take a specific countermeasure. Also, in the case where the projection 27 is made so as to have a magnetic surface property by forming a magnetic layer, it is possible to prepare the projection 27 at the same time with the formation of the transfer pattern 21.

In this way, according to the master carrier 100 of this Embodiment, by bringing the master carrier 100 into intimate contact with the slave medium 19, it is possible to perform magnetic transfer free from signal failure onto the slave medium 19 satisfactorily without causing obstacles such as deformation of the transfer pattern 21 and damage onto the surface of the slave medium 19.

Second Embodiment

Next, a master carrier according to the Second Embodiment will be described below.

Figure 5:
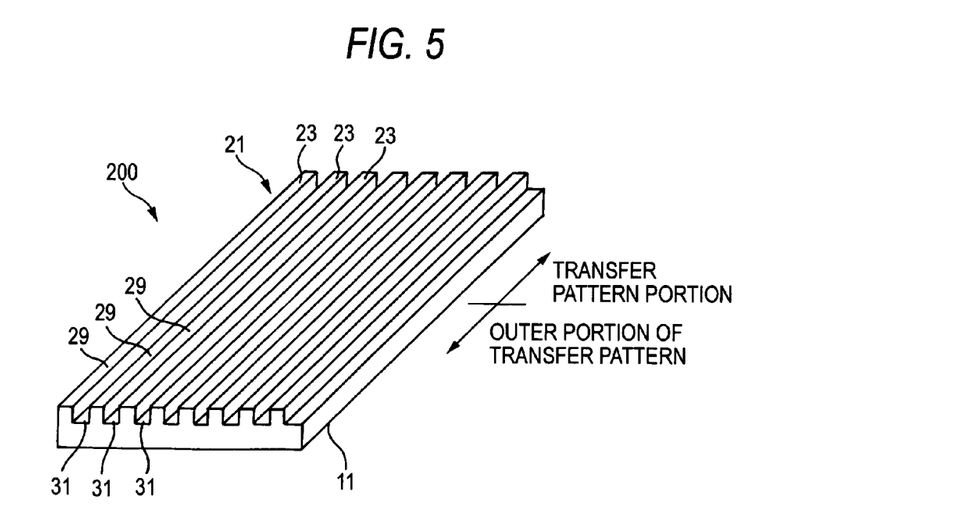
FIG. 5 is a perspective view of a part of an outer peripheral portion to explain the master carrier according to the Second Embodiment of the invention.

FIG. 5 is a perspective view of a part of an outer peripheral portion of the master carrier.

In this master carrier 200, by continuing the projection 23 of the transfer pattern 21 to both or either one of the inner peripheral side and the outer peripheral side of the transfer pattern 21, a projection 29 is radially provided in the inner and outer peripheral sides of the information writing region 25.

Further, according to this master carrier 200, the projection 29 is provided and formed in a plural number of lines with a space radially against the peripheral direction, and a depression 31 is provided between the projections 29. Accordingly, for the sake of performing magnetic transfer, when the master carrier 200 and the slave medium 19 are superposed, air between the master carrier 200 and the slave medium 19 is introduced to outside in the depression 31, whereby good adhesion between the master carrier 200 and the slave medium 19 can be obtained.

Namely, according to this master carrier 200, air between the master carrier 200 and the slave medium 19 can be completely released with good efficiency from the inside to the outside or from the outside to the inside in the radius direction, whereby good adhesion between the master carrier 200 and the slave medium 19 can be obtained rapidly and surely. Accordingly, it is designed to realize tact-up of the treatment. Further, it is possible to perform magnetic transfer with good signal quality onto the slave support 19 without causing obstacles such as deformation and damage.

Incidentally, in the master carrier 200 in which the foregoing projection 29 is provided radially, the projection 29 provided in the inner and outer peripheral sides of the information writing region 25 is provided continuously in such a manner that it is engaged with the projection 23 of the transfer pattern 21. However, it should not be construed that the projection 29 is limited to one in which it is continued to the projection 23 of the transfer pattern 21.

Figure 6:
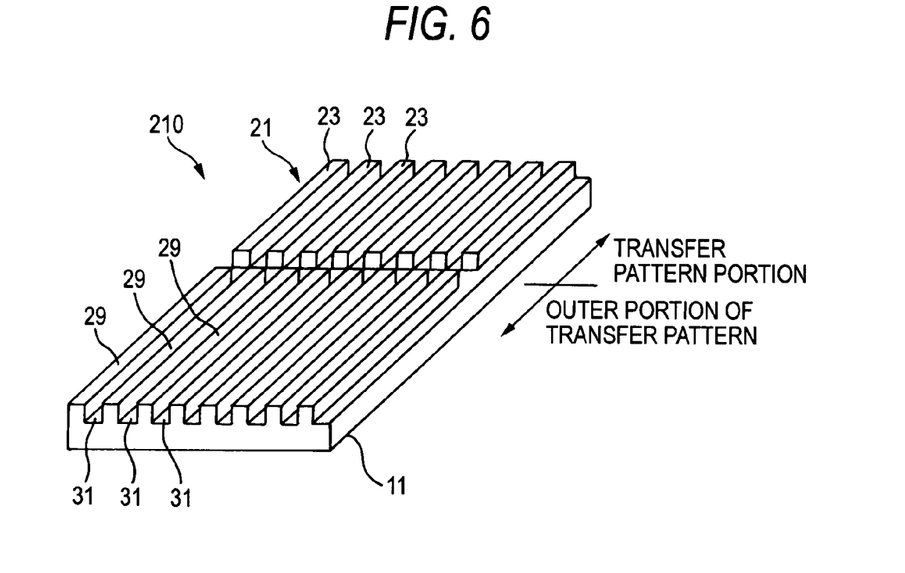
FIG. 6 is a perspective view of a part of an outer peripheral portion of a master carrier of other structure.

FIG. 6 is a perspective view of a part of an outer peripheral portion of the master carrier. As shown in FIG. 6, in this master carrier 210, the projection 29 is discontinued to the projection 23 of the transfer part 21 while providing a gap.

Further, in the case of this master carrier 210, it is also possible to perform magnetic transfer onto the slave medium 19 without causing obstacles such as deformation and damage. Moreover, it is possible to obtain good adhesion to the slave medium 19.

Also, in the foregoing master carries 200 and 210, by providing the projection 29 at a pitch the same as in the projection 23 of the transfer pattern 21, these master carriers are constructed in such a manner that the projection 29 can be simply formed at the same time with the formation of the transfer pattern 21. However, the invention is not limited thereto. A pitch between the projections 29 may be deviated from that between the projections 23 of the transfer pattern 21. In this way, it is possible to have a phase deviation at the alignment positions of the projection 23 of the transfer pattern 21. Thus, the pressure at the time of transfer is further dispersed so that the difference in level is generated more difficulty. Further, deformation of the master carrier and damage of the slave medium are prevented more surely.

Figure 7:
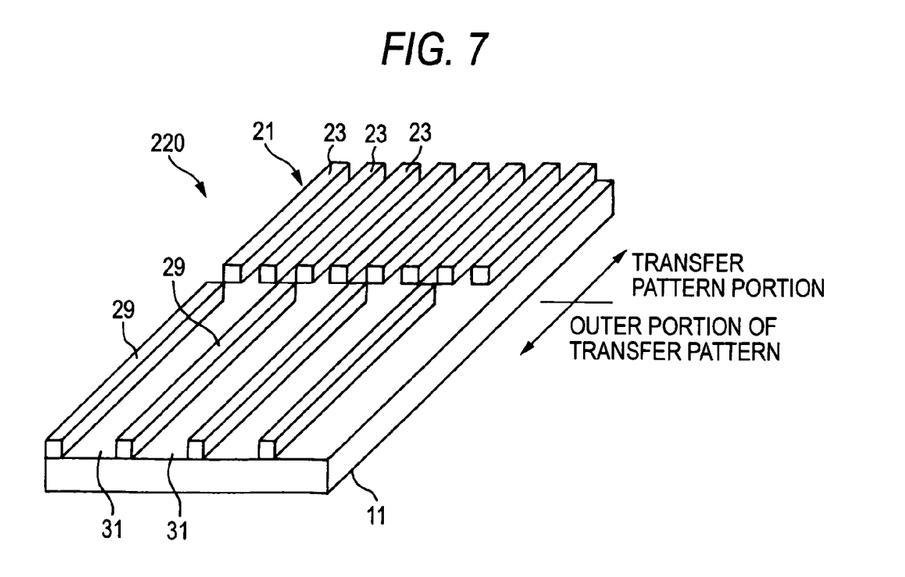
FIG. 7 is a perspective view of a part of an outer peripheral portion of a master carrier of other structure.

FIG. 7 is a perspective view of a part of an outer peripheral portion of the master carrier. As shown in this drawing, in this master carrier 220, the projection 29 is aligned at a pitch of approximately two times of the pitch between the projections 23 of the transfer pattern 21.

Further, in the case of this master carrier 220, it is also possible to perform magnetic transfer onto the slave medium 19 without causing obstacles such as deformation and damage. Moreover, it is possible to obtain good adhesion to the slave medium 19.

Also, in the foregoing master carries 200, 210 and 220, the width of the projection 29 is equal to that of the projection 23 of the transfer pattern 21. However, the width of the projection 29 may not be equal to that of the projection 23 of the transfer pattern 21.

Figure 8:
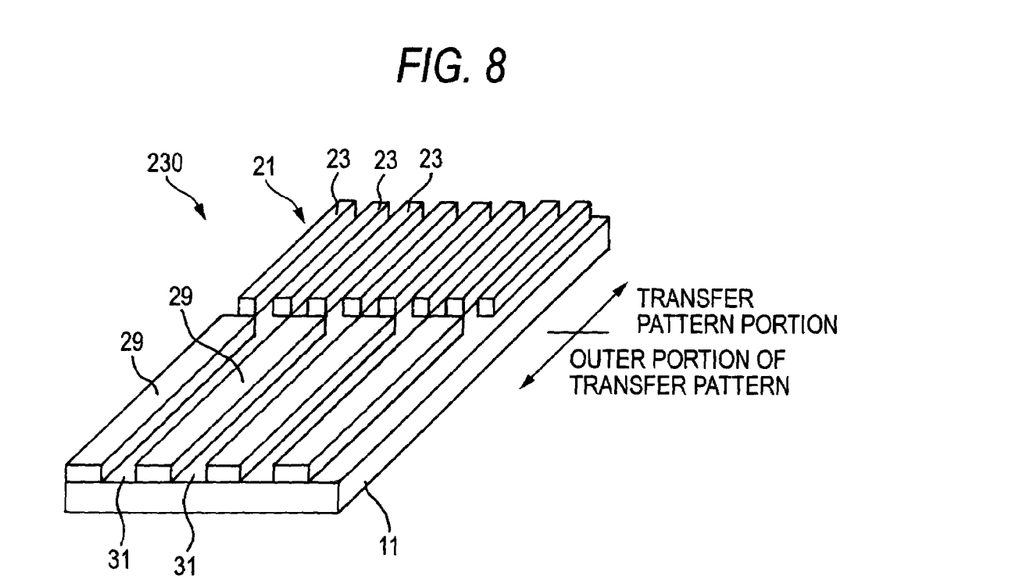
FIG. 8 is a perspective view of a part of an outer peripheral portion of a master carrier of other structure.

FIG. 8 is a perspective view of a part of an outer peripheral portion of the master carrier. As shown in this FIG. 8, in this master carrier 230, the width size of the projection 29 is larger than that of the projection 23 of the transfer pattern 21. In this way, it is possible to set up the width size of the projection 29 at an optimum width for the purposes of enhancing the adhesion and making it smooth to release the residual air.

Further, according to this master carrier 230, it is possible to perform magnetic transfer onto the slave medium 19 without causing obstacles such as deformation and damage. Moreover, it is possible to obtain good adhesion to the slave medium 19.

Third Embodiment

Next, a master carrier according to the Third Embodiment will be described below.

Figure 9:
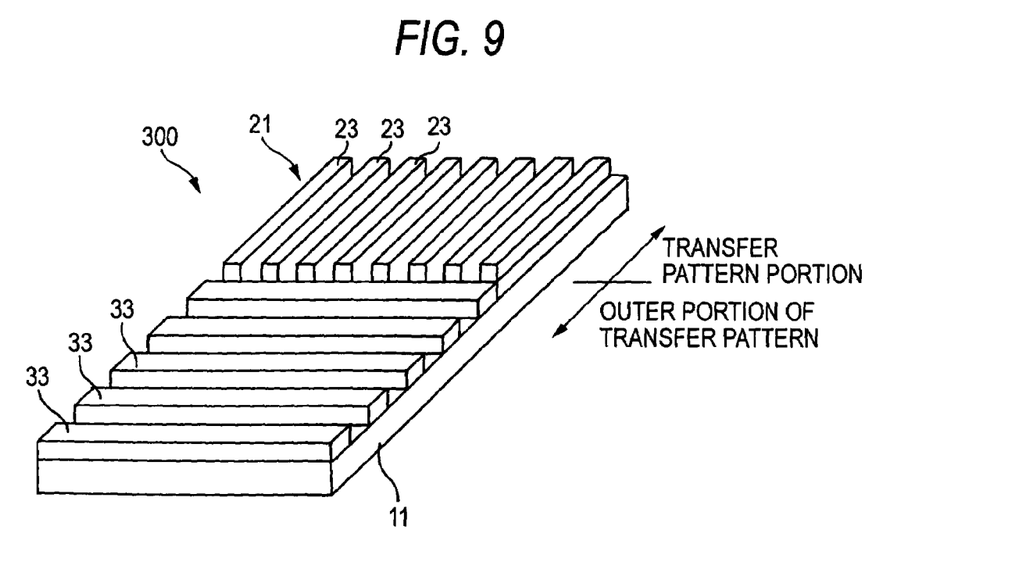
FIG. 9 is a perspective view of a part of an outer peripheral portion to explain the master carrier according to the Third Embodiment of the invention.

FIG. 9 is a perspective view of a part of an outer peripheral portion of the master carrier.

As shown in FIG. 9, in this master carrier 300, a projection 33 is provided concentrically along the peripheral direction of the master carrier 300 in both or either one of the inner peripheral side and the outer peripheral side of the information writing region 25.

Further, in the case of this master carrier 300, for the sake of performing magnetic transfer, when the master carrier 300 and the slave medium 19 are superposed, the outer peripheral side of the transfer pattern 21 is sustained by the projection 33. Accordingly, by bringing the mater carrier 300 into intimate contact with the slave medium 19, it is possible to perform magnetic transfer onto the slave medium 19 satisfactorily without causing obstacles such as deformation of the transfer pattern 21 and damage onto the surface of the slave medium 19.

Incidentally, it should be construed that the number, width or length of the foregoing projections 33 is never limited to one as in the illustrated master carrier 300.

Figure 10:
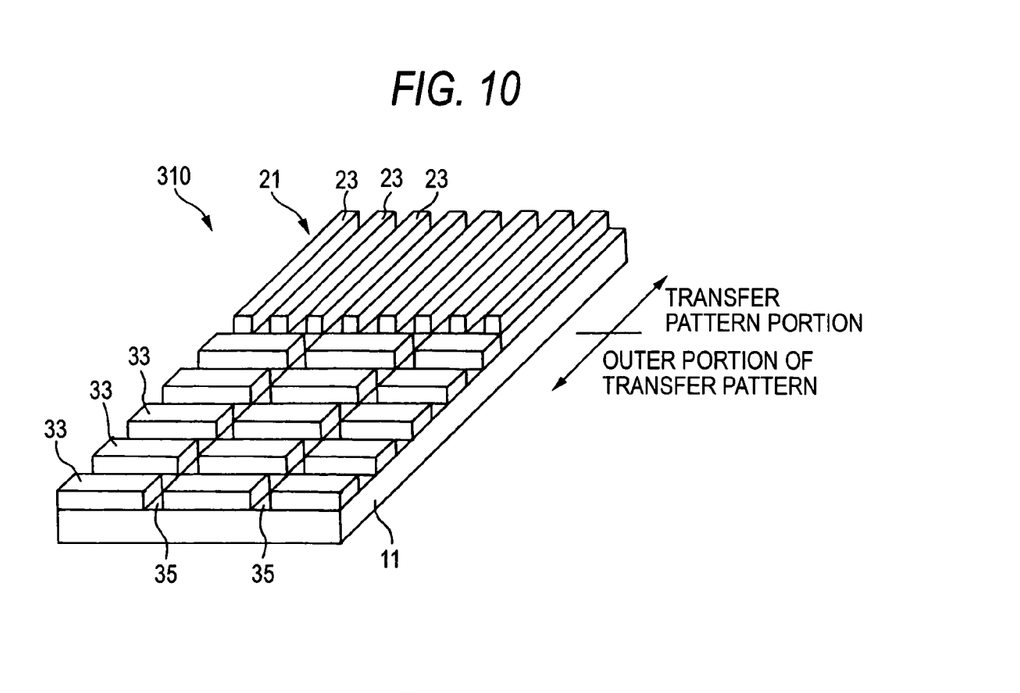
FIG. 10 is a perspective view of a part of an outer peripheral portion of a master carrier of other structure.

FIG. 10 is a perspective view of a part of an outer peripheral portion of the master carrier. In this master carrier 310, a depression part 35 is provided radially in its radius direction.

Further, according to this master carrier 310, since the radial depression 35 is provided, for the sake of performing magnetic transfer, when the master carrier 310 and the slave medium 19 are superposed, air between the master carrier 310 and the slave medium 19 is introduced outside in the radius direction in the depression 35, whereby good adhesion between the master carrier 310 and the slave medium 19 can be obtained.

Namely, according to this master carrier 310, it is possible to perform magnetic transfer onto the slave medium 19 without causing obstacles such as deformation and damage. Moreover, it is possible to obtain good adhesion to the slave medium 19.

Fourth Embodiment

Next, a master carrier according to the Fourth Embodiment will be described below.

Figure 11:
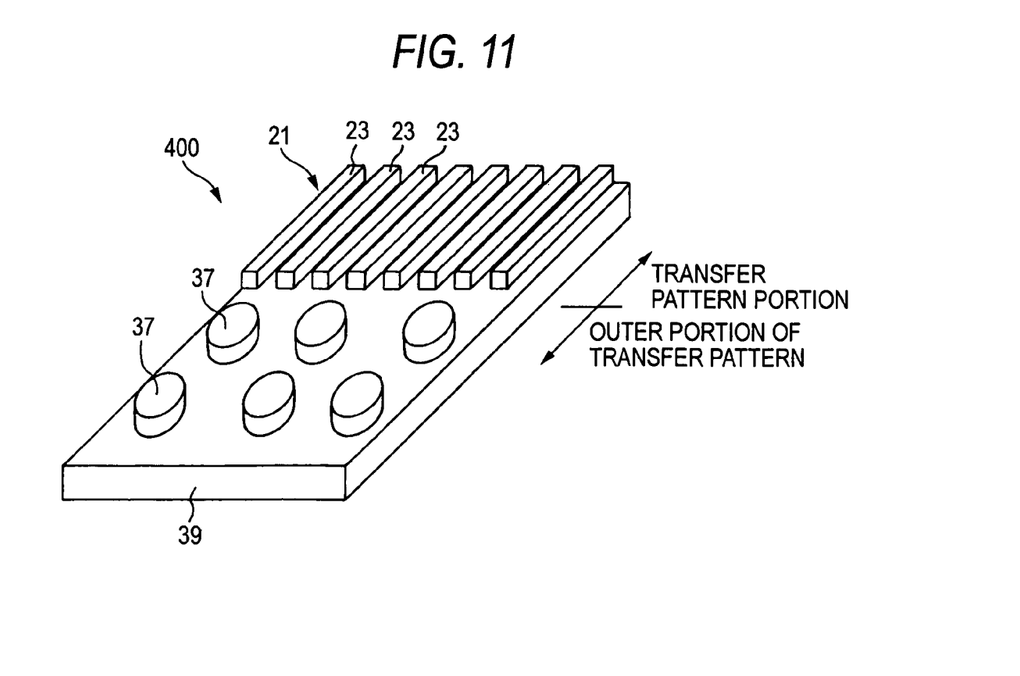
FIG. 11 is a perspective view of a part of an outer peripheral portion to explain the master carrier according to the Fourth Embodiment of the invention.

FIG. 11 is a perspective view of a part of an outer peripheral portion of the master carrier.

As shown in FIG. 11, in this master carrier 400, a depression 37 is provided in a plural number of positions in the dispersed state against the surface of the master carrier 400 in both or either one of the inner peripheral side and the outer peripheral side of the information writing region 25. By providing these projections 37, the surrounds of these projections 37 become a depression 39.

Further, in the case of this master carrier 400, for the sake of performing magnetic transfer, when the master carrier 400 and the slave medium 19 are superposed, the inner and outer peripheral sides of the transfer pattern 21 are sustained by the projections 37. Accordingly, by bringing the mater carrier 400 into intimate contact with the slave medium 19, it is possible to perform magnetic transfer onto the slave medium 19 satisfactorily without causing obstacles such as deformation of the transfer pattern 21 and damage onto the surface of the slave medium 19.

Also, in this master carrier 400, by providing the projections 37 in a plural number of positions in the dispersed state, the surroundings of the projections 37 become the depression 39. Accordingly, for the sake of performing magnetic transfer, when the master carrier 400 and the slave medium 19 are superposed, air between the master carrier 400 and the slave medium 19 can be introduced to outside in the depression 39, whereby good adhesion between the master carrier 400 and the slave medium 19 can be obtained.

Namely, according to this master carrier 400, it is possible to perform magnetic transfer onto the slave medium 19 without causing obstacles such as deformation and damage. Moreover, it is possible to obtain good adhesion to the slave medium 19.

Incidentally, in the foregoing respective Embodiments, it is preferable that at the time of bringing the master carrier into intimate contact with the slave medium 19, a gap generated by the projection 27, 29, 33 or 37 is communicated between the central side and the outer peripheral end of the master carrier 100, 200, 210, 220, 230, 300, 310 or 400. Also, it is preferable that an alignment pitch of the projection 27, 29, 33 or 37 is set up at from 0.1 μm to 1.5 mm.

Also, in all of the foregoing Embodiments, the projection 27, 29, 33 or 37 is provided in the outer peripheral side of the information writing region 25. However, the position of the projection 27, 29, 33 or 37 is not limited to only the outer peripheral side of the information writing region 25 and is effective so far as the projection 27, 29, 33 or 37 is provided in a region other than the information writing region 25.

Figure 12:
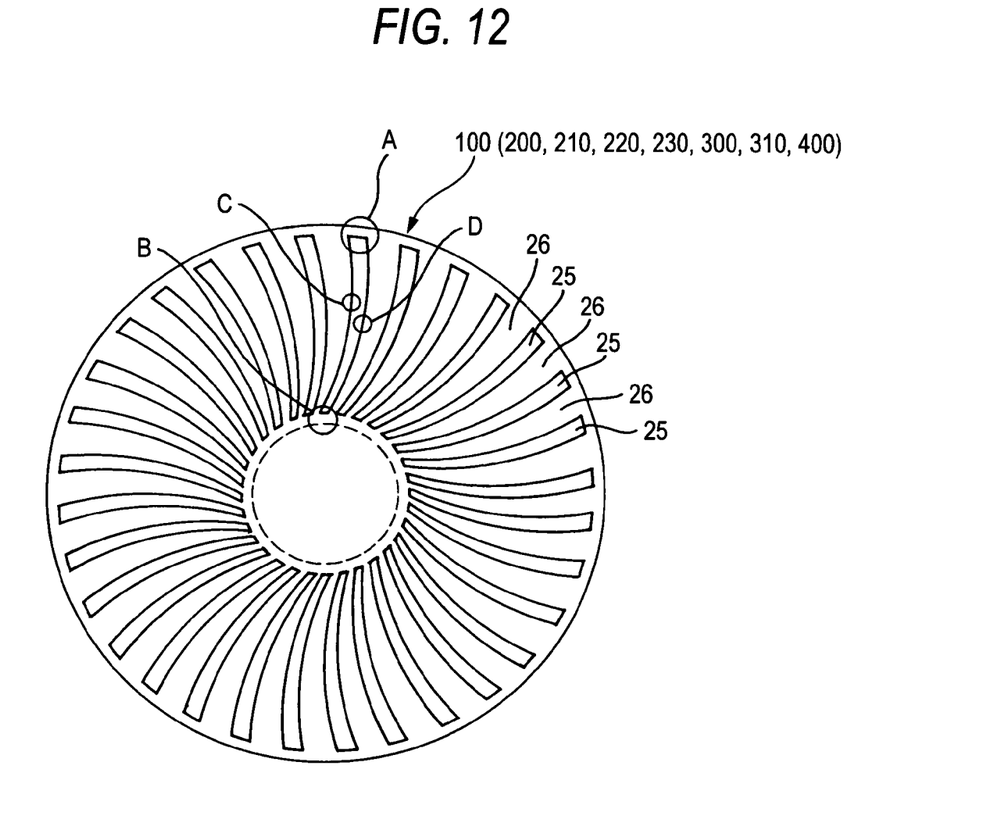
FIG. 12 is a plan view to show portions suitable for providing a projection in the master carrier.

FIG. 12 is a plan view to show portions suitable for providing a projection in the foregoing master carriers. As shown in FIG. 12, it is preferable that the projection 27, 29, 33 or 37 is provided in not only an outer peripheral side A of the information writing region 25 but also an inner peripheral side B or side portion C or D of the information writing region 25.

The present invention is not limited to the specific above-described embodiments. It is contemplated that numerous modifications may be made to the present invention without departing from the spirit and scope of the invention as defined in the following claims.

This application is based on Japanese Patent application JP 2003-303036, filed Aug. 27, 2003, the entire content of which is hereby incorporated by reference.

What is claimed is:

1. A master carrier for magnetic transfer, comprising:
   a support having a plurality of information writing regions where a projection transfer pattern having a first projection is formed, said first projection corresponding to information to be transferred onto a magnetic recording medium; and
   a magnetic layer on said transfer pattern of said support;
   wherein said master carrier has a second projection on a surface of said support,
   said second projection is formed in a region where the information writing regions are not formed to sustain said region where said information writing regions are not formed while said magnetic recording medium and said support are brought into intimate contact with each other;
   wherein said second projection is formed on a region adjacent to the information writing regions along the outermost circumferential surface of the master carrier;

wherein a space is formed between the information writing regions; and wherein said first projection and said second projection project from a surface level of the support.

2. The master carrier for magnetic transfer according to claim 1, wherein said second projection has an upper surface, and said upper surface has a substantially same height as that of said first projection of said transfer pattern from said surface of said support.

3. The master carrier for magnetic transfer according to claim 1, wherein said master carrier has at least two lines of said second projection, said lines are arranged in one of a concentric pattern and a radial pattern against said surface of said master carrier, and a first depression is formed between said lines.

4. The master carrier for magnetic transfer according to claim 1, wherein said master carrier has at least two said second projections in a dispersed state against said surface of said master carrier.

5. The master carrier for magnetic transfer according to claim 1, wherein a gap generated by said second projections at a time when said magnetic recording medium and said support are brought into intimate contact with each other is communicated between a central side of said master carrier and an outer peripheral end of said master carrier.

6. The master carrier for magnetic transfer according to claim 1, wherein said second projections are set up so as to have an alignment pitch of from 0.1 μm to 1.5 mm.

7. A process of producing a preformatted magnetic recording medium, which comprises the steps of:

preparing a magnetic carrier;

preparing a slave medium comprising a non-magnetic support having a magnetic recording layer thereon;

initially magnetizing said magnetic recording layer of said slave medium to a predetermined direction;

bringing a surface of said master medium into intimate contact with said magnetic recording layer of said slave medium at a predetermined pressure to form a conjoined body; and applying a transfer magnetic field to said conjoined body in a direction opposite to said predetermined direction, thereby obtaining said magnetic recording medium having said recorded data;

wherein said master carrier for magnetic transfer, comprising: a support having a plurality of information writing regions where a projection transfer pattern having a first projection is formed, said first projection corresponding to information to be transferred onto a magnetic recording medium; and a magnetic layer on said transfer pattern of said support, has a second projection on said surface of said support;

said second projection is formed in a region where the information writing regions are not formed to sustain said region where said information writing regions are not formed while said magnetic recording medium and said support are brought into intimate contact with each other;

wherein said second projection is formed on a region adjacent to the information writing regions along the outermost circumferential surface of the master carrier;

wherein a space is formed between the information writing regions; and wherein said first and said second projection is projected from a surface level of the support.

8. The process of producing a preformatted magnetic recording medium according to claim 7, wherein said second projection has an upper surface, and said upper surface has a substantially same height as that of said first projection of said transfer pattern from said surface of said support.

9. The process of producing a preformatted magnetic recording medium according to claim 7, wherein said master carrier has at least two lines comprising said second projection, said lines are arranged in one of a concentric pattern and a radial pattern against said surface of said master carrier, and a first depression is formed between said lines.

10. The process of producing a preformatted magnetic recording medium according to claim 7, wherein said master carrier has at least two said second projections in a dispersed state against said surface of said master carrier.

11. The process of producing a preformatted magnetic recording medium according to claim 7, wherein a gap generated by said second projections at a time when said magnetic recording medium and said support are brought into intimate contact with each other is communicated between a central side of said master carrier and an outer peripheral end of said master carrier.

12. The process of producing a preformatted magnetic recording medium according to claim 7, wherein said second projections are set up so as to have an alignment pitch of from 0.1 μm to 1.5 mm.

* * * * *